US012227428B2

(12) United States Patent
Bortun et al.

(10) Patent No.: US 12,227,428 B2
(45) Date of Patent: Feb. 18, 2025

(54) NANOCRYSTAL-SIZED CERIUM-ZIRCONIUM-ALUMINUM OXIDE MATERIAL AND METHOD OF MAKING THE SAME

(71) Applicant: Pacific Industrial Development Corporation, Ann Arbor, MI (US)

(72) Inventors: Anatoly Bortun, Ypsilanti, MI (US); Jin Cho, Utsunomiya (JP); Yunkui Li, Ann Arbor, MI (US); David Shepard, Canton, MI (US); Mila Bortun, Ypsilanti, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 826 days.

(21) Appl. No.: 17/422,770

(22) PCT Filed: Dec. 19, 2019

(86) PCT No.: PCT/US2019/067315
§ 371 (c)(1),
(2) Date: Jul. 14, 2021

(87) PCT Pub. No.: WO2020/159641
PCT Pub. Date: Aug. 6, 2020

(65) Prior Publication Data
US 2022/0064017 A1    Mar. 3, 2022

Related U.S. Application Data

(60) Provisional application No. 62/798,062, filed on Jan. 29, 2019.

(51) Int. Cl.
*C01G 25/00* (2006.01)
*B01D 53/94* (2006.01)
(Continued)

(52) U.S. Cl.
CPC ......... *C01G 25/006* (2013.01); *B01D 53/945* (2013.01); *F01N 3/022* (2013.01);
(Continued)

(58) Field of Classification Search
CPC ...... C01G 25/006; B82Y 40/00; B82Y 30/00; F01N 3/101; C01P 2004/03;
(Continued)

(56) References Cited

U.S. PATENT DOCUMENTS 9,592,498 B2 * 3/2017 Larcher ............... B01J 23/63
2013/0017947 A1 * 1/2013 Schermanz .......... B01J 37/033
502/304

(Continued)

FOREIGN PATENT DOCUMENTS

CN        1830810 A      9/2006
CN      101385969 A      3/2009
(Continued)

OTHER PUBLICATIONS

Zhang, Yu, Sara Andersson, and Mamoun Muhammed. "Nanophase catalytic oxides: I. Synthesis of doped cerium oxides as oxygen storage promoters." Applied Catalysis B: Environmental 6.4 (1995): 325-337.*

(Continued)

*Primary Examiner* — Richard M Rump
(74) *Attorney, Agent, or Firm* — Dickinson Wright PLLC

(57) ABSTRACT

A nanocrystal-sized cerium-zirconium-aluminum mixed oxide material includes at least 20% by mass zirconium oxide; between 5% to 55% by mass cerium oxide; between 5% to 60% by mass aluminum oxide; and a total of 25% or less by mass of at least one oxide of a rare earth metal selected from the group of lanthanum, neodymium, praseodymium, or yttrium. The nanocrystal-sized cerium-zirconium-aluminum mixed oxide exhibits hierarchically ordered
(Continued)

aggregates having a d50 particle size less than 1.5 μm, and retains at least 80% of surface area and pore volume after ageing at temperature higher than 1000° C. for at least 6 hours. The nanocrystal-sized cerium-zirconium-aluminum mixed oxide material is prepared using a co-precipitation method followed by milling the dried and calcined oxide material. The nanocrystal-sized cerium-zirconium-aluminum mixed oxide material forms a particulate filter that may be used in an exhaust system arising from a gas or diesel engine.

18 Claims, 4 Drawing Sheets

(51) Int. Cl.
F01N 3/022 (2006.01)
F01N 3/10 (2006.01)
F01N 3/28 (2006.01)

(52) U.S. Cl.
CPC ............ *F01N 3/101* (2013.01); *F01N 3/2803* (2013.01); *B01D 2255/2061* (2013.01); *B01D 2255/2063* (2013.01); *B01D 2255/2065* (2013.01); *B01D 2255/2066* (2013.01); *B01D 2255/20715* (2013.01); *B01D 2255/2092* (2013.01); *B01D 2255/407* (2013.01); *B01D 2255/908* (2013.01); *B01D 2255/9202* (2013.01); *B01D 2255/9205* (2013.01); *B01D 2255/9207* (2013.01); *C01P 2004/51* (2013.01); *C01P 2004/61* (2013.01); *C01P 2004/62* (2013.01); *C01P 2004/64* (2013.01); *C01P 2006/12* (2013.01); *F01N 2370/04* (2013.01)

(58) Field of Classification Search
CPC .............. C01P 2004/45; C01P 2004/61; C01P 2004/62; C01P 2004/64; C01P 2006/12; C01P 2006/14
See application file for complete search history.

(56) References Cited

U.S. PATENT DOCUMENTS

2015/0298099 A1    10/2015  Saito et al.
2018/0304235 A1*   10/2018  Harris .................... B01J 37/031

FOREIGN PATENT DOCUMENTS

| | | | |
|---|---|---|---|
| CN | 102513085 A | 6/2012 | |
| CN | 103191711 A | 7/2013 | |
| CN | 103648638 A | 3/2014 | |
| CN | 103889554 A | 6/2014 | |
| CN | 103191712 B * | 12/2014 | ............. B01J 23/10 |
| CN | 104540782 A | 4/2015 | |
| CN | 106944031 A | 7/2017 | |
| EP | 2924009 A1 | 9/2015 | |
| EP | 3266519 A1 | 1/2018 | |
| JP | 2000271480 A * | 10/2000 | ........... B01D 53/945 |
| WO | 2015049575 A1 | 4/2015 | |

OTHER PUBLICATIONS

Li, Cai, et al. "Preparation of Ce—Zr—La—Al2O3 and supported single palladium three-way catalyst." Chinese Journal of Catalysis 29.2 (2008): 108-112.*

European Patent Office, Rijswijk, Netherlands, International Search Report of International Application No. PCT/US2019/067315, Mailed Apr. 20, 2020, 4 pages.

Kiaole Weng, et al., "Continuous Syntheses of Highly Dispersed Composite Nanocatalysts via Simultaneous Co-Precipitation in Supercritical Water," Applied Catalysis B: Environmental, Elsevier, Amsterdam, NL, vol. 103, No. 3, Feb. 8, 2011, pp. 453-461, XP028166714, ISSN: 0926-3373, DOI: 10.1016/J.APCATB.2011.02.009.

* cited by examiner

NANOCRYSTAL-SIZED CERIUM-ZIRCONIUM-ALUMINUM OXIDE MATERIAL AND METHOD OF MAKING THE SAME

CROSS REFERENCE TO RELATED APPLICATIONS

This application is a national stage filing of International Application No. PCT/US2019/067315 filed on Dec. 19, 2019, designating the United States and published in English, which claims the benefit of the filing date under 35 U.S.C. § 119 (e) of U.S. Provisional Application No. 62/798,062 filed on Jan. 29, 2019, the entire contents of which are incorporated herein by reference in their entirety.

FIELD

The invention generally relates to inorganic complexes, especially to catalyst support materials having oxygen storage capacity and high thermal stability, their method of manufacture and applications thereof. The materials of this disclosure are capable of being incorporated into particulate filters used in flow through three-way catalyst (TWC) and wall-through gasoline or diesel engine exhaust catalytic converters.

BACKGROUND

The statements in this section merely provide background information related to the present disclosure and may not constitute prior art. A typical wash coat includes a catalyst support of gamma, delta, and theta alumina or lanthanum (La) stabilized alumina, ceria-zirconia with oxygen storage capacity and platinum group metals (PGM), such as Pt, Pd, and Rh introduced by nitrate solutions. The PGM may be coated onto a cordierite honeycomb substrate, combined in a slurry mixture that comprises the catalyst support material and oxygen storage material, or coated as a separate step following the application of the washcoat slurry (catalyst support material and oxygen storage material) to make the catalyst. The function of the catalyst is to change the composition of a mobile engine exhaust from carbon monoxide (CO), all kinds of hydrogen carbon compounds (HC), and nitrogen oxygen compounds (NOx) to innocuous carbon dioxide ($CO_2$), water ($H_2O$), and Nitrogen ($N_2$).

As an important composition of a three-way catalyst (TWC), zirconia-stabilized ceria and other ceria based oxides play a major role in oxygen storage and release under lean and rich fuel conditions, thereby, enabling the oxidation of CO and volatile organics and the reduction of $NO_x$. High efficient catalytic performance also relates to high specific surface area and thermal stability, as well as high oxygen storage capacity.

Pure ceria is the best oxygen storage material, but its poor thermal stability limits its application at high temperature. Zirconia stabilized ceria, $CeO_2$-$ZrO_2$, has improved the materials' thermal stability and oxygen storage capacity compared with $CeO_2$. The complex oxide with a molar ratio of Ce to Zr of 1:1 can form a solid solution $Ce_{0.5}Zr_{0.5}O_2$ of cubic phase, which improves OSC performance. Nevertheless, the thermal stability of this kind of material is poor after aging at high temperature, for example, after aging at 1000° C. for several hours, the specific surface area of this material will typically be less than 30 $m^2/g$.

Alumina is one example of a thermal stabilizer additive for use with $CeO_2$-$ZrO_2$. Other additives include alkaline earth, rare earth and silicon elements or mixture thereof. The total amount of such stabilizers added is usually controlled to be less than 10 wt. % based on the entire amount of oxides present. However, more recently, up to 90 wt. % alumina has been added into $CeO_2$-$ZrO_2$ for improving thermal stability and OSC. The introduction of alumina into Ce—Zr oxide results in efficient improvement of thermal stability and OSC. Accordingly, there exists a desire to provide new types of catalyst support materials having high thermal stability and high OSC for use in catalytic converters.

Particulate matter that exists in the exhaust arising from automobiles equipped with a fuel direct injection engine (e.g., both gasoline and diesel fueled) have a negative impact on human health and its emission therefore needs to be regulated. Gasoline particulate filters (GPF) and diesel particulate filters (DPF) are considered to be the solution. Both GPF and DPF consist of a wall flow substrate and a catalyst washcoat applied on to the substrate. In order to ensure the GPF and/or DPG function effectively, the washcoat that is used needs to comprise very small particles so that the gas passages in the substrate are not blocked. Generally. it is considered that the $D_{50}$ size of the particles in the washcoat needs to be below 1.5 µm. However, the general understanding is that the thermal durability of the $CeO_2$—$ZrO_2$ material, which is one of the important components in the washcoat, will become significantly reduced if the material is milled down to below a $D_{50}$ of 1.5 µm. For example, comparing specific surface area (SSA) after high temperature aging of unmilled and milled materials, a material that has been milled to below a $D_{50}$ of 1.5 µm would have 30% less SSA than the same material, which was unmilled.

SUMMARY

This disclosure generally provides a composition for a catalyst support material having oxygen storage capacity and high thermal stability, as well as a method of manufacture and applications thereof. The materials of this disclosure are capable of being incorporated into particulate filters used in flow through three-way catalyst (TWC) and wall-through gasoline or diesel engine exhaust catalytic converters.

A nanocrystal-sized cerium-zirconium-aluminum mixed oxide comprises at least 20% by mass zirconium oxide; between 5% to 55% by mass cerium oxide; between 5 to 60% by mass of aluminum oxide; and a total of 25% or less by mass of at least one oxide of a rare earth metal selected from the group of lanthanum, neodymium, praseodymium, or yttrium. The nanocrystal-sized cerium-zirconium-aluminum mixed oxide exhibits hierarchically ordered aggregates having a $d_{50}$ particle size less than 1.5 µm, alternatively, less than 500 nanometers. The nanocrystal-sized cerium-zirconium-aluminum mixed oxide material is capable of retaining at least 75% of its specific surface area (SSA) and pore volume (PV) after exposure to or ageing at a temperature of 1000° C. or higher for at least 6 hours; alternatively, at least 80%; alternatively, at least 85% of its SSA and PV. The hierarchically ordered aggregates in the nanocrystal-sized cerium-zirconium-aluminum mixed oxide consist of oxide crystallites that have a size ranging from 5 nm to 30 nm.

According to another aspect of the present disclosure, a method of forming a nanocrystal-sized cerium-zirconium-aluminum mixed oxide material is provided. This method comprising the steps of:
 (a) preparing an acidic solution containing polymerized zirconium oligomers;

(b) mixing an acidic solution of cerium and rare earth salts with the zirconium oligomer containing solution to make a polyvalent metal containing mixture;

(c) mixing the acidic polyvalent metal containing mixture with a solution of a complexing reagent;

(d) allowing the mixture formed in step (c) to form a zirconium-based precursor slurry containing constituent metal hydroxides;

(e) neutralizing the zirconium containing precursor slurry with a base to achieve co-precipitation of the constituent metal hydroxides and formation of a precipitated material;

(f) washing the precipitate material with water to remove unreacted cationic and anionic admixtures;

(g) mixing the washed, precipitated material with water to form a re-slurry;

(h) adding an aluminum reagent to the re-slurry to form a cerium-zirconium-aluminum-based mixed hydroxide material;

(i) collecting the cerium-zirconium-aluminum-based mixed hydroxide material;

(j) ageing and/or drying the cerium-zirconium-aluminum-based mixed hydroxide material at ambient temperature or at an elevated temperature for a predetermined time;

(k) calcining the dry, aged cerium-zirconium-aluminum-based mixed hydroxide material to form the cerium-zirconium-aluminum mixed oxide material; and (l) milling the calcined cerium-zirconium-aluminum mixed oxide material to a $d_{50}$ particle size of less than 1.5 μm.

In this method, the milling of the calcined cerium-zirconium-aluminum mixed oxide material yields a $d_{50}$ particle size of less than 1.5 micrometers; alternatively, less than 750 nanometers (nm); alternatively, less than 500 nm. The complexing reagent comprises anions have an affinity towards zirconium and are selected from the group consisting of a sulfate, an oxalate, a succinate, a fumarate, and combinations thereof. The amount of complexing reagent and the amount of zirconium in the acidic polyvalent metal containing mixture that forms the zirconium-based precursor slurry are present such that the molar ratio of complexing agent to zirconium is in the range of about 0.35 to about 1.05. The base is selected from the group of alkali metal hydroxides, aqueous ammonia, or tetraalkylammonium hydroxide, while the aluminum reagent is selected from group consisting of dispersible aluminum hydroxide, dispersible boehmite, aluminum oxide, and aluminum oxide doped with by La, Ba, Ce and/or Zr.

According to yet another aspect of the present disclosure, a particulate filter may be formed using the nanocrystal-sized cerium-zirconium-aluminum mixed oxide. The nanocrystal-sized cerium-zirconium-aluminum mixed oxide may be applied as a washcoat to a wall-flow substrate in order to form the particulate filter. The particulate filter may be used in a three-way catalytic converter (TWC) application, a gasoline particulate filter (GPF) application, or a diesel particulate filter (DPF) application.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

Figure 1:
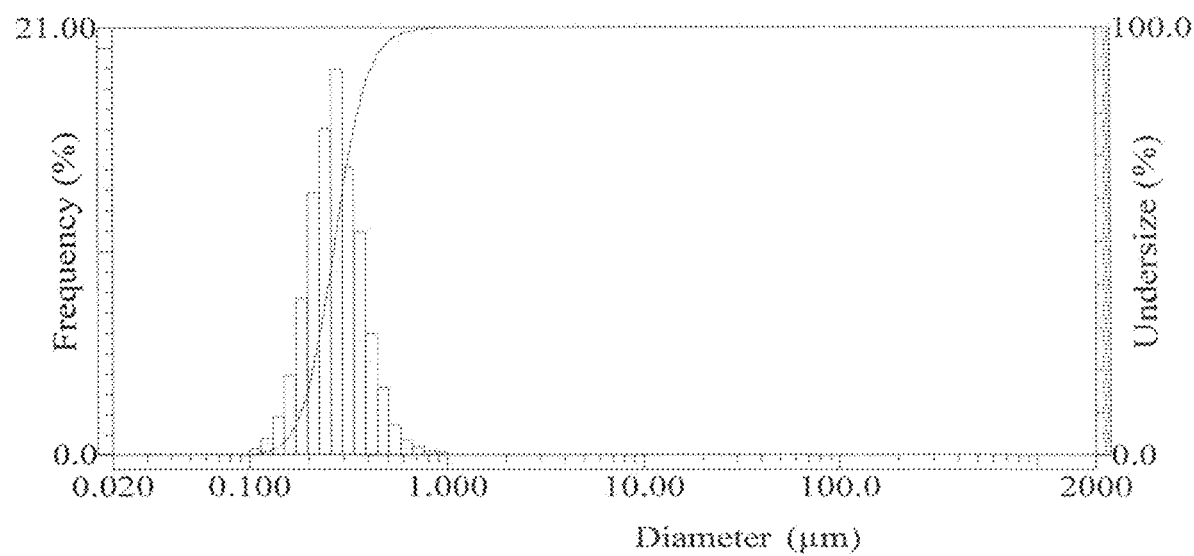
FIG. 1 is a graphical representation of the particle size distribution measured for a cerium-zirconium-aluminum mixed oxide material after milling.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the nanocrystal-sized cerium-zirconium-aluminum mixed oxide material made and used according to the teachings contained herein is described throughout the present disclosure in conjunction with a particulate filter for use in an automotive exhaust catalytic converter in order to more fully illustrate the structural elements and the use thereof. The incorporation and use of such a mixed oxide material in other applications, including without limitation as a catalyst support in various industrial processes, is contemplated to be within the scope of the present disclosure. It should be understood that throughout the description and drawings, corresponding reference numerals indicate like or corresponding parts and features.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

The present disclosure generally provides a nanocrystal-sized cerium-zirconium-aluminum mixed oxide material, which is suitable for use in flow-through three-way catalyst (TWC) converters and wall-through gasoline particulate filter (GPF) or diesel-particulate-filter (DPF) applications. The cerium-zirconium-aluminum mixed oxide material exhibits facile oxygen storage mobility. In a GPF and/or DPF, the material will need to have a very small particle size in order to avoid an increase in back-pressure when it is coated on a wall-flow substrate. A specific feature of the nanocrystal-sized cerium-zirconium-aluminum mixed oxide material is that it exhibits a very high specific surface area (SSA) and pore volume (PV) after aging at 1,000° C. for 6 hours, wherein the SSA and PV after aging is maintained to be greater than 75% of the SSA and PV measured prior to the material being milled. The SSA of the nanocrystal-sized cerium-zirconium-aluminum mixed oxide material may be greater than 40 m²/g after aging at 1000° C. for 6 hours. The nanocrystal-sized cerium-zirconium-aluminum mixed oxide material comprises, consists of, or consists essentially of oxide crystallites having a size ranging from 5 nm to 30 nm that are assembled into hierarchically ordered aggregates with a $D_{50}$ particle size less than 1.5 μm; alternatively, less than 750 nm; alternatively, less than 500 nm; alternatively, less than about 200 nm.

The nanocrystal-sized cerium-zirconium-aluminum mixed oxide material comprises, consists of, or consisted essentially of a mixture of zirconium oxide, cerium oxide, aluminum oxide, and at least one oxide of rare earth metal. The rare earth metal may be, without limitation, lanthanum, neodymium, praseodymium, or yttrium. Alternatively, the rare earth metal is selected to be either lanthanum, neodymium, praseodymium, or yttrium.

According to one aspect of the present disclosure, the composition of the nanocrystal-sized cerium-zirconium-aluminum mixed oxide material generally includes at least 20% by mass zirconium oxide; between 5% to 55% by mass cerium oxide; between 5% to 60% by mass aluminum oxide; and a total of 25% or less by mass of at least one oxide of a rare earth metal. Alternatively, the amount of zirconium oxide present in the mixed oxide material is between 20% to 60% by mass; alternatively, between about 25% to 55% by mass. The amount of cerium oxide present in the mixed oxide material may alternatively be between 10% to 45% by mass; alternatively, about 15% to 40% by mass. The amount of aluminum oxide present in the mixed oxide material may alternatively be between 10% to 45% by mass; alternatively, less than about 40% by mass. Alternatively, the amount of the rare earth metal oxide in the cerium-zirconium-aluminum mixed oxide material ranges from about 1% to 15% by mass; alternatively, between 3% and 10% by mass.

The nanocrystal-sized cerium-zirconium-aluminum mixed oxide material exhibits hierarchically ordered aggregates having a $D_{50}$ particle size less than 1.5 μm consisting of oxide crystallites having a size ranging from 5 nm to 30 nm. Alternatively, the $D_{50}$ particle size of the hierarchically ordered aggregates is less than 1 micrometer (μm); alternatively, less than about 750 nanometers (nm); alternatively, less than about 500 nanometers (nm); alternatively, less than about 300 nm; alternatively, 200 nm or less. Referring to FIG. 1, the particle size measured for one batch of cerium-zirconium-aluminum mixed oxide material formed according to the teachings of the present disclosure is shown to be less than 500 nm with the greatest amount being less than about 200 nm. The particle size distribution may be measured using any known conventional technique, including but not limited to using a laser particle size analyzer.

The nanocrystal-sized cerium-zirconium-aluminum mixed oxide material exhibits a specific surface area (SSA) after ageing at 1,000° C. for 6 hours that is at least 40 m²/g. Alternatively, the specific surface area (SSA) after ageing at 1,000° C. for 6 hours is at least 50 m²/g; alternatively, about 55 m²/g or higher. The nanocrystal-sized cerium-zirconium-aluminum mixed oxide material exhibits a SSA after ageing at 1,100° C. for 6 hours that is at least 20 m²/g. Alternatively, the specific surface area (SSA) after ageing at 1,100° C. for 6 hours is at least 25 m²/g; alternatively, about 30 m²/g or higher.

The nanocrystal-sized cerium-zirconium-aluminum mixed oxide material exhibits a total pore volume after calcination at a temperature of 900° C. or more that is at least 0.35 cm³/g. Alternatively, the cerium-zirconium-aluminum mixed oxide material exhibits a total pore volume after calcination at 1,000° C. is at least 0.3 cm³/g. Alternatively, the cerium-zirconium-aluminum mixed oxide material exhibits a total pore volume after calcination at 1,000° C. is at least 0.2 cm³/g.

Figure 2:
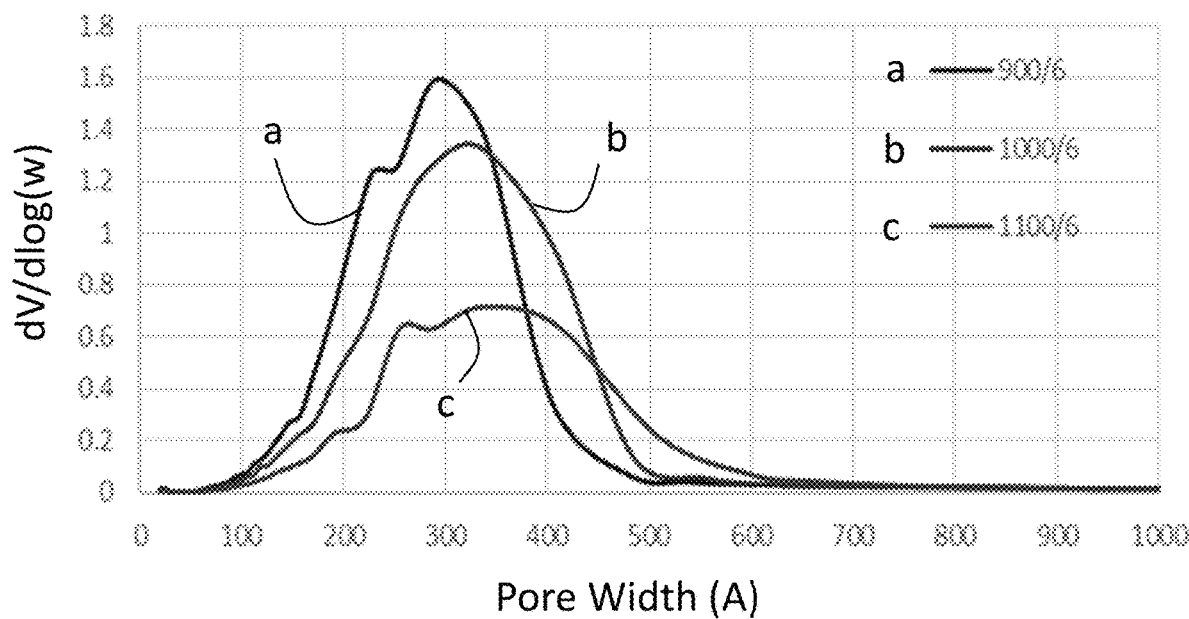
FIG. 2 is a graphical representation of the pore size distribution measured for unmilled cerium-zirconium mixed oxide materials prepared according to the teachings of the present disclosure.

The nanocrystal-sized cerium-zirconium-aluminum mixed oxide also exhibits a pore size distribution that remains unchanged over the temperature range from 900° C. to 1,100° C. Referring now to FIG. 2, the pore size distribution is compared for the cerium-zirconium-aluminum mixed oxide aged at (a) 900° C. for 6 hours; (b) 1,000° C. for 6 hours; and (c) 1,100° C. for 6 hours. The pore size distribution shown in (a), (b), and (c) remain essentially unchanged. Alternatively, the pore size distribution shifts to pores having a slightly larger size as the thermal exposure level increases.

The specific surface area (SSA) and pore volume (PV) measured for the nanocrystal-sized cerium-zirconium-aluminum mixed oxide material before aging is retained after aging or calcination at 1,000° C. or higher for at least 6 hours at a level that is at least 75% of the SSA and PV measured prior to the milling of the material. Alternatively, the SSA and PV is retained at a level that is at least 80%; alternatively, at least 85% of the SSA and PV measured prior to the material being milled. The specific surface area (SSA) and pore volume (PV) may be measured using a conventional Brunauer, Emmett, and Teller (BET) method.

The cerium-zirconium-aluminum mixed oxide is a powdered material comprising, consisting of, or consisting essentially of agglomerates having irregular or quasi-globular shapes of variable size ranging from about 2-3 micrometers (μm) up to about 10-15 μm. The agglomerates may exhibit a complex fine structure that is formed with nano-sized particles having dimensions ranging from about 50 nanometers (nm) to about 200 nm. Since the cerium-zirconium-aluminum mixed oxide is a crystalline material with an average crystallite size of about 5 up to about 30 nm as determined by x-ray diffraction (XRD) and/or transmission electron microscopy (TEM) data, the cerium-zirconium-aluminum mixed oxide comprises a hierarchically ordered structure.

Another aspect of the present disclosure features a precipitation method of making the nanocrystal-sized cerium-zirconium-aluminum mixed oxide material. This method generally comprises the preparation of a solution containing pre-polymerized zirconium oligomers, cerium, and rare earth metals that can interact with a complexing reagent having affinity towards zirconium and form a zirconium-based precursor. The co-precipitation of all constituent metal hydroxide present in this precursor occurs under basic conditions. Subsequently, an aluminum reagent is added to a slurry formed by placing the precipitate into water. The aluminum reagent can be a Boehmite, an aluminum hydroxide sol, alumina, or alumina doped with an element, such as a rare earth element, an alkaline earth element, zirconium (Zr), or any other element that is generally considered in the industry to be beneficial for the improvement of the thermal durability of alumina. After subjecting the cerium-zirconium-aluminum mixed oxide material to a milling process a nanocrystal-sized material is obtained.

Figure 3:
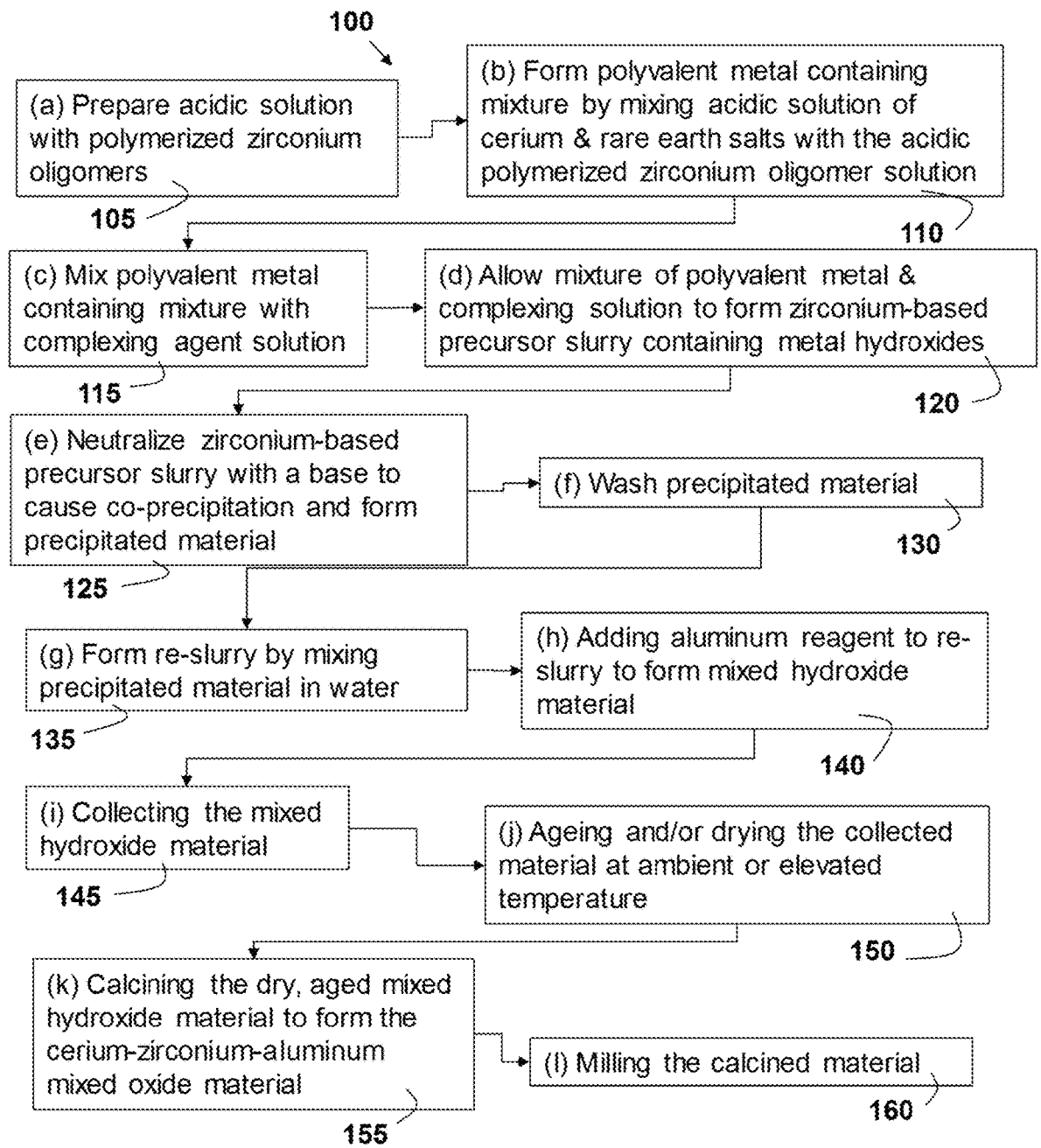
FIG. 3 is a flowchart of a method for forming cerium-zirconium-aluminium mixed oxide materials.

Referring now to FIG. 3, the method of preparing the nanocrystal-sized cerium-zirconium-aluminum mixed oxide material is described in detail. This method 100 comprises the steps of (a)-(l) as described in FIG. 3 and as further defined herein. Step (a) includes preparing 105 an acidic solution containing polymerized zirconium oligomers. Then in step (b) an acidic solution of cerium and rare earth salts is mixed 110 with the zirconium oligomer containing solution to make a polyvalent metal containing mixture. In step (c) the acidic polyvalent metal containing mixture is mixed 115 with a solution of a complexing reagent. The mixture formed in step (c) is then allowed 120 in step (d) to react and form a zirconium-based precursor slurry containing constituent metal hydroxides. The zirconium containing precursor slurry is then neutralized 125 in step (e) with a base to achieve co-precipitation of the constituent metal hydroxides and the formation of a precipitated material. In step (f), the precipitated material is washed 130 with water to remove any unreacted cationic and anionic admixtures. The washed, precipitated material is then added 135 to water in step (g) to form a re-slurry. An aluminum reagent is added 140 to this re-slurry in step (h) to form a mixed hydroxide material. In step i) the mixed hydroxide material is collected 145 and then in step (j) subjected to ageing or drying 150 at ambient temperature or at an elevated temperature for a predetermined amount of time. The aged mixed oxide is then calcined 155 in step (k) to form the cerium-zirconium-aluminum mixed oxide material. Finally, in step (I) the calcined cerium-zirconium-aluminum mixed oxide material is milled 160 to reduce particle size.

In step (a), the polymerized zirconium oligomers may comprise, without limitation, zirconium octamers. These zirconium octamers may be present in an amount ranging from about 30% to 100% by mass of zirconium oligomers. According to one aspect of the present disclosure, the polymerized zirconium oligomers do not contain zirconia sol particles.

In step (b), the acidic solution of cerium and rare earth metal salts may formed using one or more water soluble salts of cerium and rare earth metals in which the anions are nitrates, chlorides, sulfates, acetates, or a combination thereof.

In step (c), the complexing reagent may comprise anions that have an affinity towards zirconium. The complexing agent may be selected from the group consisting of a sulfate, an oxalate, a succinate, a fumarate, and combinations thereof. The amount of complexing reagent and the amount of zirconium present in the acidic polyvalent metal containing mixture that is used to form the zirconium-based precursor slurry in step (d) are present such that the molar ratio of the complexing agent to zirconium is in the range of 0.30 to 1.05; alternatively, in the range of about 0.35 to about 0.85; alternatively, in the range of about 0.45 to about 0.75.

In step (e), the base used to neutralize the zirconium-based precursor slurry may be selected from the group of alkali metal hydroxides, aqueous ammonia, and tetraalkylammonium hydroxide. Alternatively, the base may include ammonia solution, ammonium carbonate, and ammonium hydrogen carbonate or their mixture. During the co-precipitation, the pH may be selected to be in the range of about 6.0 to about 10.0, alternatively in the range of about 6.0 to about 9.0; and the precipitation temperature selected to be in the range of about 40 to 90° C.

The precipitate is filtered and washed (step f) with or without surfactants. When utilized, the surfactants may include anyone or a combination of polyvinyl alcohol (PVA), polyvinyl amine, polyethylene glycol-200 (PEG-200), isopropyl alcohol (IPA), ethanol, and melamine with the dosage or amount ranging from about 1% to about 30%, alternatively about 6 to about 10%.

The precipitate material is re-slurried (step g) by mixing in water. Optionally the re-slurry may be further aged at higher than 100° C. in an autoclave at a pH in the range of 2-12. An aluminum reagent is added (step h) to the re-slurry to form a mixed hydroxide material. The aluminum reagent may be one or more selected from group consisting of dispersible aluminum hydroxide, dispersible Boehmite, aluminum oxide, and aluminum oxide doped with La, Ce, Ba, Sr, Mg, and/or Zr. The $Al_2O_3$ or doped $Al_2O_3$ may be milled to a $D_{50}$ that is in a range lower than 10 µm; alternatively, lower than 5 µm; alternatively, below 1.5 µm. The mixed hydroxide material is collected (step i) and then aged or dried (step j) at ambient or an elevated temperature. This elevated temperature may be, without limitation, greater than ambient temperature; alternatively, greater than 30° C.; alternatively, greater than 50° C.; alternatively, greater than 100° C.; alternatively, less than about 200° C.

The dried, aged mixed oxide material is then calcined (step k) at about 500° C. to about 1100° C. for about 2-6 hours to form the cerium-zirconium-aluminum mixed oxide material in the form of a powder. Alternatively, the dried, aged mixed oxide material is calcined at about 900 to about 1100° C. for about 4-6 hours.

In step (k) the calcined cerium-zirconium-aluminum mixed oxide material is milled 155 to reduce particle size. After milling the $D_{50}$ particle size of the nanocrystal-sized cerium-zirconium-aluminum mixed oxide material is less than 1.5 µm; alternatively, less than 1.0 µm; alternatively, less than about 750 nanometers (nm); alternatively, less than 500 nm; alternatively, less than 300 nm; alternatively, less than about 200 nm. The milling of the mixed oxide material may be accomplished by any method known in the art, including but not limited to the use of a ball mill (dry or wet), an attritor mill, a roll mill (single or multi-stage), a colloid mill, an impact mill or a mixture thereof. Alternatively, the cerium-zirconium-aluminum mixed oxide material is subjected to wet ball milling.

According to another aspect of the present disclosure, the nanocrystal-sized cerium-zirconium-aluminum mixed oxide material having the composition and properties described above may be used in a conventional three-way-catalyst (TWC). More beneficially, the cerium-zirconium-aluminum mixed oxide is used to coat a particulate filter. Alternatively, a particulate filter is formed using a washcoat comprising the nanocrystal-sized cerium-zirconium-aluminum oxide material prepared according to the method of FIG. 3. This particulate filter may be used in a flow through three-way catalytic converter (TWC) application, a gasoline particulate filter (GPF) application, or a diesel particulate filter (DPF) application.

Figure 4A:
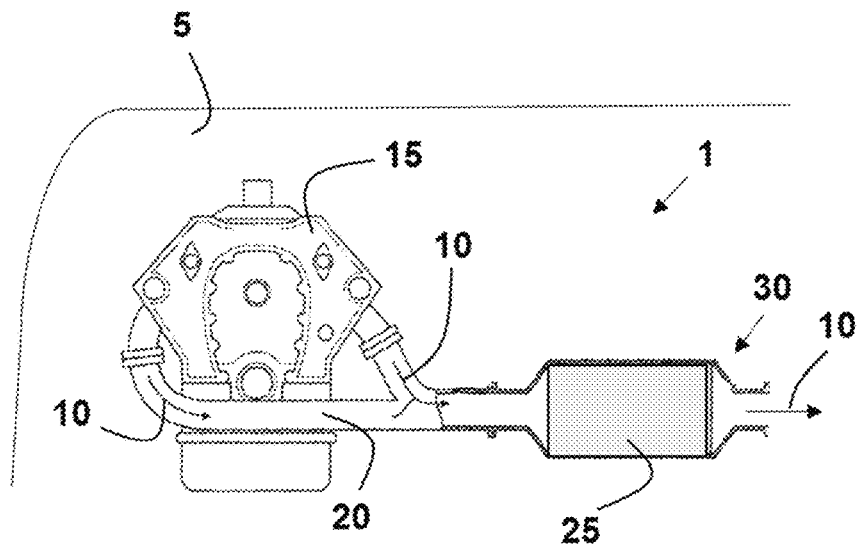
FIGS. 4A and 4B represent perspective views of a vehicle's exhaust system with a particulate filter formed according to the teachings of the present disclosure.
Figure 4B:
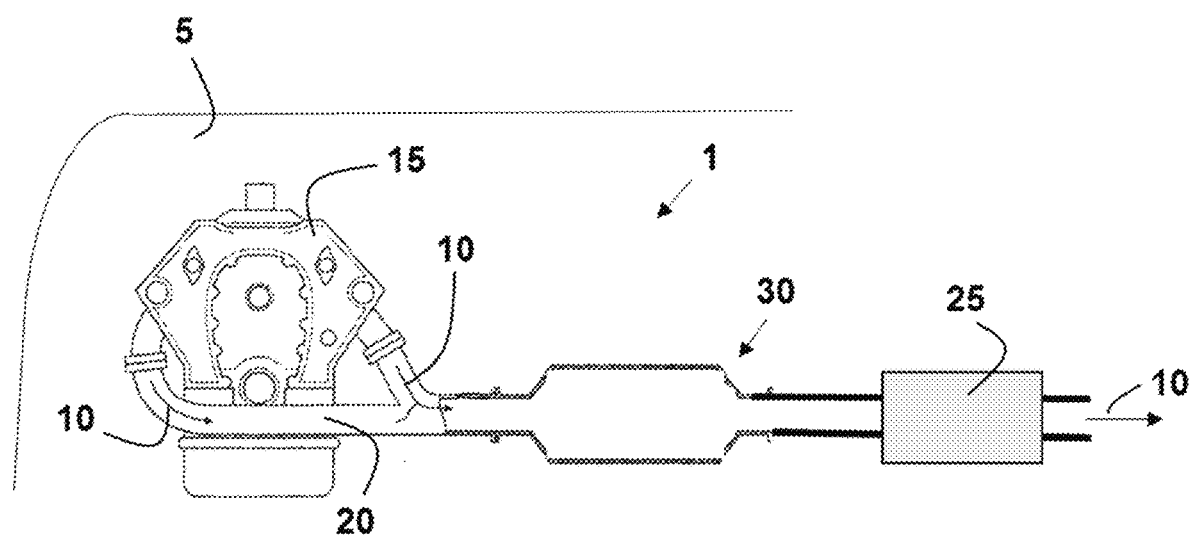

The nanocrystal-sized cerium-zirconium-aluminum mixed oxide material may be used to create a catalyst composition in the form of self-supporting particulates, a monolithic structure, or as one or more washcoats disposed on to the surface of a substrate to form the particulate filter. Referring now to FIGS. 4A and 4B, an exhaust system 1 for a vehicle 5 is shown in which an exhaust gas 10 passes from the vehicle's engine 15 through a pipe or ductwork 20 and through a particulate filter 25. This particulate filter 25 may be incorporated as part of a three-way catalytic (TWC) converter 30 as shown in FIG. 4A or positioned in-line therewith (FIG. 4B).

The catalyst composition generally includes the nanocrystal-sized cerium-zirconium-aluminum oxide alone or with the incorporation of one or more platinum group metals. The washcoat may further comprise a binder material, such as alumina, silica, (non-zeolite) silica-alumina, naturally occurring clays, $TiO_2$, $ZrO_2$, and $SnO_2$.

The substrate or monolithic structure may comprise any ceramic or metal honeycomb structure that has one or more gas flow passages extending there through. A honeycomb shape for a monolith substrate provides a large catalytic surface having a minimal overall size and pressure drop. The catalyst composition may be applied to a portion of the structure walls that define said passages such that the gases flowing through the passages contact the catalyst composition. The flow passages are thin-walled channels having any desired cross-sectional shape or size such, including but not limited to, trapezoidal, rectangular, square, oval, and circular.

One skilled in the art will understand that the substrate may also be a wall-flow filter substrate, in which the flow passages are alternately blocked, such that the gases are only allowed to flow in one general direction. Thus, use of a wall flow substrate provides the added benefit of being able of remove particulate matter from the flowing gases along with gaseous pollutants. The wall-flow filter substrate may be made from materials commonly known in the art, including but not limited to cordierite, aluminum titanate, or silicon carbide. The amount of the catalyst composition that is applied to the wall flow substrate will depend on substrate's properties such as porosity and wall thickness.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Example 1-Preparation of
Cerium-Zirconium-Aluminum Oxide Material
Comprising 14% $CeO_2$-48.8% $ZrO_2$-30.2%
$Al_2O_3$-3.6% $La_2O_3$-3.5% $Pr_6O_{11}$ A solution containing Zr, Ce, La, and Pr salts is prepared by mixing 127.3 grams of $ZrOCl_2*8H_2O$, 36.0 grams of $Ce(NO_3)_3*6H_2O$, 13.0 grams of a 27.4 wt. % praseodymium nitrate solution and 8.6 grams of 26.85 wt. % lanthanum nitrate solution with 1,200 ml of deionized (DI) water. Then, 138.7 grams of a 10 wt. % NaOH solution is added to this polyvalent metal-containing solution and mixed until a clear solution is formed. A total of 132 grams of a 20% $(NH_4)_2SO_4$ solution is then added to the polyvalent metal mixture to form a zirconium-based precursor slurry. Finally, a 20 wt. % NaOH solution is slowly added until the pH of the reaction mixture reaches a value of 13. The precipitate that forms is filtered using a Buchner filter and washed with deionized water to remove any excess cations and/or anions. The washed ceria-zirconia mixed hydroxide is re-slurried in DI water to form a 7% slurry. A total of 38 grams of a water-dispersible Boehmite is added to the re-slurry under mixing to form cerium-zirconium-aluminum-based mixed hydroxides. The cerium-zirconium-aluminum-based mixed hydroxides is collected using a Buchner filter and then dried in an electric oven at 130° C. for about 12 hours. The dry material is calcined in air at 700° C. for 2 hours. The calcined sample is then additionally aged at 1,000° C. and 1,100° C. for 6 hours.

The cerium-zirconium-aluminum based mixed oxide calcined at 700° C. is once again re-slurried in DI water to make a 20 wt. % slurry. This re-slurry is then subjected to wet-ball milled using a jar mill. The milled material exhibits a $d_{50}$ particle size on the order of 270 nm (see FIG. 1). The milled cerium-zirconium-aluminum based mixed oxide is dried in an electric oven at 110° C. for about 12 hours and then calcined in air at 700° C. for 2 hours. The calcined milled mixed oxide is then additionally aged at 1,000° C. and 1,100° C. for 6 hours. The pore radius for the material is measured after calcination at 700° C. and after ageing at 1,000° C. and 1,100° C. (see FIG. 2).

The specific surface area (SSA) and pore volume (PV) of the milled and un-milled cerium-zirconium-aluminum-based mixed oxide material as measured after calcination at 1000° C. and 1100° C. are summarized in Table 1 below.

TABLE 1

|  | SSA-1000° C., $m^2/g$ | PV-1000° C., cc/g | SSA-1100° C., $m^2/g$ | PV-1100° C., cc/g |
| --- | --- | --- | --- | --- |
| Un-milled | 54.1 | 0.47 | 30.6 | 0.26 |
| Milled | 54.1 | 0.49 | 29.1 | 0.26 |
| Change, % | 0 | +4 | −5 | 0 |

Example 2-Preparation of
Cerium-Zirconium-Aluminum Oxide Material
Comprising 24.5% $CeO_2$-38.2% $ZrO_2$-30.2%
$Al_2O_3$-3.5% $La_2O_3$-3.5% $Pr_6O_{11}$ A solution containing Zr, Ce, La, and Pr salts is prepared by mixing 99.7 grams of $ZrOCl_2*8H_2O$, 63.2 grams of $Ce(NO_3)_3*6H_2O$, 13.0 grams of a 27.4 wt. % praseodymium nitrate solution and 8.6 grams of 26.85 wt. % lanthanum nitrate solution with 1,200 grams of deionized (DI) water. Then, 96 grams of a 10 wt. % NaOH solution is added to the polyvalent metal containing solution and mixed until a clear solution is formed. A total of 100 grams of a 20 wt. % $Na_2SO_4$ solution is then added to the solution containing the polymerized zirconium oligomers followed by the slow addition of a 20 wt. % NaOH solution until the pH of the reaction mixture reaches a value of 13. The formed precipitate is filtered using a Buchner filter and washed with deionized water to remove any excess of chloride, nitrate, sulfate, and/or sodium ions. The washed ceria-zirconia mixed hydroxide is re-slurried in DI water to form a 7 wt. % slurry. Then, a total of 38 grams of a water-dispersible boehmite is added under mixing to form cerium-zirconium-aluminum-based mixed hydroxides.

The wet, cerium-zirconium-aluminum-based mixed hydroxide material is dried in an electric oven at 130° C. for 12 hours and then calcined in air at 700° C. for 2 hours. The calcined sample is then additionally aged at 1,000° C. and 1,100° C. for 6 hours.

The cerium-zirconium-aluminum based mixed oxide calcined at 700° C. is once again re-slurried in DI water to make 20 wt. % slurry. This re-slurry is then subjected to wet-ball milled using jar mill to yield a material that exhibits a $d_{50}$ particle size on the order of 250 nm. The milled cerium-zirconium-aluminum mixed oxide material is then dried in an electric oven at 110° C. for about 12 hours and calcined in air at 700° C. for 2 hours. The calcined milled mixed oxide is then additionally aged at 1,000° C. and 1,100° C. for 6 hours.

The specific surface area (SSA) and pore volume (PV) of the milled and un-milled cerium-zirconium-aluminum mixed oxide material measured after calcination at 1,000° C. and 1,100° C. are summarized in Table 2.

TABLE 2

|  | SSA-1000° C., $m^2/g$ | PV-1000° C., cc/g | SSA-1100° C., $m^2/g$ | PV-1100° C., cc/g |
|---|---|---|---|---|
| Un-milled | 55.6 | 0.46 | 34.0 | 0.30 |
| Milled | 49.2 | 0.40 | 35.0 | 0.36 |
| Change, % | −12 | −13 | +3 | +20 |

TABLE 3

|  | SSA-1000° C., $m^2/g$ | PV-1000° C., cc/g | SSA-1100° C., $m^2/g$ | PV-1100° C., cc/g |
|---|---|---|---|---|
| Un-milled | 45.4 | 0.39 | 21.9 | 0.19 |
| Milled | 42.2 | 0.41 | 23.2 | 0.21 |
| Change, % | −7 | +5 | +6 | +10 |

Example 3-Preparation of Cerium-Zirconium-Aluminum Oxide Material Comprising 30% $CeO_2$-51.1% $ZrO_2$-10.1% $Al_2O_3$-4.4% $La_2O_3$-4.4% $Pr_6O_{11}$ A solution containing Zr, Ce, La, and Pr salts is prepared by mixing 65.6 grams of $ZrOCl_2*8H_2O$, 38.0 grams of $Ce(NO_3)_3*6H_2O$, 8.1 grams of a 27.4 wt. % praseodymium nitrate solution and 7.5 grams of 26.85 wt. % lanthanum nitrate solution with 900 grams of deionized (DI) water. Then, 63 grams of a 10 wt. % NaOH solution is added to the polyvalent metal containing solution and mixed until a clear solution is formed. A total of 70 grams of a 20 wt. % $Na_2SO_4$ solution is then added to the solution containing the polymerized zirconium oligomers followed by the slow addition of a 20 wt. % NaOH solution until the pH of the reaction mixture reaches a value of 13. The formed precipitate is filtered using a Buchner filter and washed with deionized water to remove any excess chloride, nitrate, sulfate, and/or sodium ions. The precipitate is re-slurried in DI water to form a 7 wt. % slurry. Then, a total of 13 grams of a water dispersible boehmite is added under mixing to form a cerium-zirconium-aluminum-based mixed hydroxide material.

The wet, cerium-zirconium-aluminum-based mixed hydroxide material is collected and dried in an electric oven at 130° C. for 12 hours. The dry material is then calcined in air at 700° C. for 2 hours. The calcined material is then additionally aged at 1,000° C. and 1,100° C. for 6 hours.

The cerium-zirconium-aluminum based mixed oxide calcined at 700° C. is once again re-slurried in DI water to make a 20 wt. % slurry. This slurry is then subjected to wet-ball milled using a jar mill. The resulting powder exhibits a particle size $d_{50}$ that is on the order of 250 nm. The milled cerium-zirconium-aluminum based mixed oxide is dried in an electric oven at 110° C. for about 12 hours and then calcined in air at 700° C. for 2 hours. The calcined milled mixed oxide is then additionally aged at 1,000° C. and 1,100° C. for 6 hours.

The specific surface area (SSA) and pore volume (PV) of the milled and un-milled cerium-zirconium-aluminum based mixed oxide after calcination at 1,000° C. and 1,100° C. are summarized in the Table 3 below.

Example 4-Preparation of Cerium-Zirconium-Aluminum Oxide Material Comprising 33% $CeO_2$-24% $ZrO_2$-40% $Al_2O_3$-1.5% $La_2O_3$-1.5% $Y_2O_3$ A solution containing Zr, Ce, and Y salts is prepared by mixing 68.6 grams of a 21.0 wt. % zirconium nitrate, 69.8 grams of a 28.4 wt. % cerium nitrate and 4.7 grams of 19.3 wt. % yttrium nitrate solution with 800 grams of deionized (DI) water. Then, 45 grams of a 10 wt. % NaOH solution is added to the polyvalent metal-containing solution and mixed until a clear solution is formed. A total of 41 grams of a 20 wt. % $Na_2SO_4$ solution is then added to the solution containing the polymerized zirconium oligomers followed by the slow addition of a 20 wt. % NaOH solution until the pH of the reaction mixture reaches a value of 13. The formed precipitate is filtered using a Buchner filter and washed with deionized water to remove any excess of nitrate, sulfate, and/or sodium ions. The washed precipitate is then re-slurried in DI water to form a 7 wt. % slurry. A total of 25 grams of a lanthanum-stabilized alumina (4 wt. % $La_2O_3$) is added under mixing to form a cerium-zirconium-aluminum-based mixed hydroxide material.

The wet, cerium-zirconium-aluminum-based mixed hydroxides is dried in an electric oven at 130° C. for 12 hours and then calcined in air at 700° C. for 2 hours. The calcined sample is then additionally aged at 900° C., 1,000° C. and 1,100° C. for 2 hours.

The cerium-zirconium-aluminum-based mixed oxide material calcined at 700° C. is re-slurried in DI water to make 20 wt. % slurry. This re-slurry is then subjected to wet-ball milling using a jar mill. The resulting powder exhibits a particle size $d_{50}$ that is on the order of 350 nm. The milled cerium-zirconium-aluminum based mixed oxide has been dried in an electric oven at 110° C. for about 12 hours and then calcined in air at 700° C. for 2 hours. The calcined milled mixed oxide is then additionally aged at 900° C., 1,000° C. and 1,100° C. for 2 hours.

The specific surface area (SSA) and pore volume (PV) of the milled and un-milled cerium-zirconium-aluminum-based mixed oxide material after calcination at 900° C., 1000° C. and 1100° C. are summarized in Table 4.

TABLE 4

|  | SSA-900° C., m2/g | PV-900° C., m2/g | SSA-1000° C., m2/g | PV-1000° C., cc/g | SSA-1100° C., m2/g | PV-1100° C., cc/g |
|---|---|---|---|---|---|---|
| Un-milled | 75.2 | 0.60 | 61.6 | 0.49 | 48.9 | 0.43 |
| Milled | 78.1 | 0.60 | 72.5 | 0.51 | 46.6 | 0.39 |
| Change, % | +4 | 0 | +17 | +4 | −5 | −10 |

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A nanocrystal-sized cerium-zirconium-aluminum mixed oxide material comprising between 25% to 55% by mass zirconium oxide;
   between 15% to 40% by mass cerium oxide;
   between 10% to 45% by mass aluminum oxide; and
   a total of 3% to 10% by mass of at least one oxide of a rare earth metal selected from the group of lanthanum, neodymium, praseodymium, or yttrium;
   wherein the nanocrystal-sized cerium-zirconium-aluminum mixed oxide material exhibits hierarchically ordered aggregates having a $d_{50}$ particle size less than 750 nm after milling formed of nano-sized oxide particles consisting of oxide crystallite having a size ranging from 5 nm to 30 nm;
   wherein the nanocrystal-sized cerium-zirconium-aluminum mixed oxide material exhibits a specific surface area (SSA) of at least 40 $m^2/g$ after aging at 1,000° C. for 6 hours; and
   wherein the SSA and pore volume (PV) is 75% or more of the SSA and PV of the nanocrystal-sized cerium-zirconium-aluminum mixed oxide material prior to milling step.

2. The mixed oxide material of claim 1, wherein the SSA and PV of the mixed oxide material after aging is at least 80% of the SSA and PV of the mixed oxide material prior to milling.

3. The mixed oxide material of claim 1, wherein the SSA and PV of the mixed oxide material after aging is at least 85% of the SSA and PV of the mixed oxide material prior to milling.

4. The mixed oxide material of claim 1, wherein the mixed oxide exhibits facile oxygen storage mobility.

5. A method of forming a nanocrystal-sized cerium-zirconium-aluminum mixed oxide material according to claim 1, the method comprising the steps performed in the following order of:
   (a) preparing an acidic solution containing polymerized zirconium oligomers; the polymerized zirconium oligomers comprising zirconium octamers in an amount ranging from about 30 to 100% by weight based on the overall weight of the polymerized zirconium oligomers;
   (b) mixing an acidic solution of cerium and rare earth salts with the zirconium oligomer containing solution to make a polyvalent metal containing mixture;
   (c) mixing the acidic polyvalent metal containing mixture with a solution of a complexing reagent;
   (d) allowing the mixture formed in step (c) to form a zirconium-based precursor slurry containing constituent metal hydroxides;
   (e) neutralizing the zirconium containing precursor slurry with a base to achieve co-precipitation of the constituent metal hydroxides and formation of a precipitated material;
   (f) washing the precipitate material with water to remove unreacted cationic and anionic admixtures;
   (g) mixing the washed, precipitated material with water to form a re-slurry; wherein the re-slurry is optionally aged at higher than 100° C. in an autoclave at a pH in the range of 2-12;
   (h) adding an aluminum reagent to the re-slurry to form a cerium-zirconium-aluminum-based mixed hydroxide material;
   (i) collecting the cerium-zirconium-aluminum-based mixed hydroxide material;
   (j) ageing and/or drying the cerium-zirconium-aluminum-based mixed hydroxide material at ambient temperature or at an elevated temperature for a predetermined time;
   (k) calcining the dry, aged cerium-zirconium-aluminum-based mixed hydroxide material to form the cerium-zirconium-aluminum mixed oxide material; and
   (l) milling the calcined cerium-zirconium-aluminum mixed oxide material to a $d_{50}$ particle size of less than 1.5 μm.

6. The method according to claim 5, wherein the milling of the calcined cerium-zirconium-aluminum mixed oxide material yields a $d_{50}$ particle size of less than 750 nm.

7. The method according to claim 5, wherein the polymerized zirconium oligomers do not contain zirconia sol particles.

8. The method according to claim 5, wherein the complexing reagent comprises anions that have an affinity towards zirconium; the complexing reagent is selected from the group consisting of a sulfate, an oxalate, a succinate, a fumarate, and combinations thereof.

9. The method according to claim 5, wherein the amount of complexing reagent and the amount of zirconium in the acidic polyvalent metal containing mixture that form the zirconium-based precursor slurry are present such that the molar ratio of complexing agent to zirconium is in the range of about 0.35 to about 1.05.

10. The method according to claim 5, wherein the polyvalent metal-containing mixture comprises water soluble nitrates, chlorides, sulfates, acetate salts, or a combination thereof.

11. The method according to claim 5, wherein the base is selected from the group of alkali metal hydroxides, aqueous ammonia, or tetraalkylammonium hydroxide.

12. The method according to claim 5, wherein the aluminum reagent is one or more selected from the group consisting of dispersible aluminum hydroxide, dispersible Boehmite, aluminum oxide, and aluminum oxide doped with an rare earth element, an alkaline earth element, zirconium (Zr) or another element that is considered beneficial for the improvement of the thermal durability of alumina.

13. A particulate filter comprising the nanocrystal-sized cerium-zirconium-aluminum mixed oxide material according to claim 1.

14. A particulate filter comprising the nanocrystal-sized cerium-zirconium-aluminum mixed oxide material formed according to the method of claim 5.

15. The particulate filter according to claim 13, wherein the nanocrystal-sized cerium-zirconium-aluminum mixed oxide material has a D50 particle size that is less than 1.5 μm and a specific surface area that is at least 40 m$^2$/g after aging at 1,000° C. for 5 hours.

16. The particulate filter according to claim 15, wherein the nanocrystal-sized cerium-zirconium-aluminum mixed oxide material exhibits a specific surface area (SSA) before and after aging at 1,000° C. for 5 hours; wherein the SSA after aging is maintained to be greater than 85% of the SSA of the mixed oxide material prior to milling.

17. The particulate filter according to claim 13, wherein the nanocrystal-sized cerium-zirconium-aluminum mixed oxide material is applied as a washcoat to a wall-flow substrate in order to form the particulate filter.

18. A three-way catalytic converter (TWC), a gasoline particulate filter (GPF), or a diesel particulate filter (DPF) comprising the particulate filter according to claim 13.

* * * * *